(12) United States Patent
Hirose

(10) Patent No.: US 7,172,211 B2
(45) Date of Patent: Feb. 6, 2007

(54) OCCUPANT RESTRAINT SYSTEM

(75) Inventor: Toshikazu Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 10/889,425

(22) Filed: Jul. 12, 2004

(65) Prior Publication Data
US 2005/0236818 A1 Oct. 27, 2005

(30) Foreign Application Priority Data
Apr. 27, 2004 (JP) ............................. 2004-131148

(51) Int. Cl.
B60R 21/22 (2006.01)
(52) U.S. Cl. ................................. 280/730.2; 280/728.2
(58) Field of Classification Search ............ 280/728.2, 280/728.3, 730.1, 730.2, 728.1
See application file for complete search history.

(56) References Cited

U.S. PATENT DOCUMENTS

| 6,302,434 | B2 * | 10/2001 | Nakajima et al. | ........ | 280/730.2 |
| 6,305,707 | B1 * | 10/2001 | Ishiyama et al. | ........ | 280/728.2 |
| 6,530,594 | B1 * | 3/2003 | Nakajima et al. | ........ | 280/730.2 |
| 6,644,687 | B2 * | 11/2003 | Saito et al. | ........... | 280/730.2 |
| 2005/0173902 | A1 * | 8/2005 | Boxey | .................. | 280/730.2 |
| 2005/0253366 | A1 * | 11/2005 | Uno et al. | ............. | 280/730.2 |

FOREIGN PATENT DOCUMENTS

| JP | 2001-122073 | 5/2001 |
| JP | 2002-059802 | 2/2002 |
| JP | 2002-362287 | 12/2002 |

* cited by examiner

Primary Examiner—Paul N. Dickson
Assistant Examiner—Toan C. To
(74) Attorney, Agent, or Firm—Rankin, Hill, Porter & Clark LLP

(57) ABSTRACT

An end edge of a roof lining is engaged in a roof lining engaging groove extending along a side surface of an upper end portion of a pillar garnish at a side of a pillar, thereby eliminating a gap in a connecting portion between the pillar garnish and the roof lining to improve the appearance. Airbag deployment guide walls extend to an outside of a vehicle compartment from an upper end of a roof lining engaging groove at the side of the pillar, and an airbag module is disposed at a position sandwiched by the pillar and the roof lining, above the airbag deployment guide walls. Therefore, an inflating airbag is guided to the side of the vehicle compartment so as not to be caught by the upper end of the pillar garnish and can be deployed into the vehicle compartment by reliably pressing to open the roof lining, without providing a special guide member.

12 Claims, 9 Drawing Sheets

OCCUPANT RESTRAINT SYSTEM

BACKGROUND OF THE INVENTION

1. Field of the Invention

The present invention relates to an occupant restraint system in which an airbag module accommodating an airbag in a folded state is placed along a side edge of a roof, and the airbag inflated at a time of collision of a vehicle presses to open a connecting portion between a roof lining covering the roof from a side of a vehicle compartment and a pillar garnish covering a pillar from the side of the vehicle compartment, and deploys downward into the vehicle compartment.

2. Description of the Related Art

Japanese Patent Application Laid-open No. 2001-122073 discloses an occupant restraint system in which a horizontal guide wall 32f extending to a center pillar 22, and a projection 32a extending upward from a tip end of the guide wall 32f and engaging in a mounting hole 22b of the center pillar 22 are provided at an upper part of a center pillar garnish 32, and a gap between the center pillar 22 and the center pillar garnish 32 is closed with the guide wall 32f, in order to prevent the situation in which an airbag, which deploys into a curtain shape along an inner surface of a vehicle compartment from a side edge of a roof, slips into the gap between the center pillar 22 and the center pillar garnish 32 and cannot smoothly deploy.

Also, Japanese Patent Application Laid-open No. 2002-362287 discloses an occupant restraint system in which a projecting portion 52, which is formed of a metal plate and projects into a vehicle compartment, is provide at a position at a side of a center pillar 12 and above a portion where a roof lining 47 and a center pillar garnish 53 are connected, and an inflating airbag 21 is guided to the vehicle compartment with a guide surface 52a of the projecting portion 52, in order to solve the same problem as that described above.

However, in each of the above-described inventions described in Japanese Patent Application Laid-open Nos. 2001-122073 and 2002-362287, the connecting portions of the roof lining and the center pillar garnish only butt to each other in the vertical direction, and therefore there arises the problem that the dimension of the gap between them is not stabilized to make the appearance worse. Especially when the roof lining and the center pillar garnish expand or contract due to temperature difference, the gap is increased or decreased, and the appearance is further worsened.

In the above-described invention disclosed in Japanese Patent Application Laid-open No. 2001-122073, the guide wall 32f is provided at a lower position from the upper end of the center pillar garnish 32, and therefore there exists the possibility that the airbag is caught by the upper end of the center pillar garnish 32 projecting upward beyond the guide wall 32f, and is prevented from deploying. In the above-described invention in Japanese Patent Application Laid-open No. 2002-362287, the guide portion 59 having the guide surface 59a for guiding the deploying airbag is formed by a separate member from the center pillar garnish 53, and therefore there arises the problem of increasing the number of components and the number of assembling steps.

SUMMARY OF THE INVENTION

The present invention is made in view of the above-described circumstances, and has an object to improve appearance of a connecting portion between a roof lining and a center pillar garnish, and to smoothly guide a deploying airbag without increasing the number of components.

In order to achieve the above-described object, according to a first feature of the present invention, there is provided an occupant restraint system in which an airbag module accommodating an airbag in a folded state is placed along a side edge of a roof, and the airbag inflated at a time of collision of a vehicle presses to open a connecting portion between a roof lining covering the roof from a side of a vehicle compartment and a pillar garnish covering a pillar from the side of the vehicle compartment, and deploys downward into the vehicle compartment, wherein the pillar garnish comprises a roof lining engaging groove which extends along a side surface of its upper end portion at a side of the pillar, an airbag deployment guide wall which extends to an outside of the vehicle compartment from an upper end of the roof lining engaging groove at the side of the pillar, and a locking projection which extends upward from an end portion of the airbag deployment guide wall at the outside of the vehicle compartment, and wherein an end edge of the roof lining is engaged in the roof lining engaging groove of the pillar garnish, the locking projection of the pillar garnish is engaged in a locking hole formed in the pillar, and the airbag module is disposed at a position sandwiched by the pillar and the roof lining, above the airbag deployment guide wall.

According to the above-described construction, the end edge of the roof lining is engaged in the roof lining engaging groove extending along the side surface of the upper end portion of the pillar garnish which is at the side of the pillar, and therefore a gap in the connecting portion between the pillar garnish and the roof lining is eliminated to improve the appearance. The airbag deployment guide wall extends to the outside of the vehicle compartment from the upper end of the roof lining engaging groove at the side of the pillar, and the airbag module is disposed at the position sandwiched by the pillar and the roof lining, above the airbag deployment guide wall. Therefore, the inflating airbag is guided toward the vehicle compartment so as not to be caught by the upper end of the pillar garnish, and can be deployed into the vehicle compartment by reliably pressing to open the roof lining, without providing a special guide member. In addition, the locking projection extending upward from the end portion of the airbag deployment guide wall of the pillar garnish at the outside of the vehicle compartment is engaged in the engaging hole formed in the pillar, and therefore assembling of the pillar garnish is facilitated.

According to a second feature of the present invention, in addition to the above-described first feature, a rib which bites into the end edge of the roof lining engaging in the roof lining engaging groove, is provided at an inner surface of the roof lining near the pillar.

According to the above-described construction, the rib provided at the inner surface of the roof lining engaging groove, which is near the pillar, bites into the end edge of the roof lining, and therefore the end edge of the roof lining is pressed against the inner surface of the roof lining engaging groove, which is near the vehicle compartment, with the reaction force from the rib to eliminate a gap, thus further improving the appearance of the connecting portion between the pillar garnish and the roof lining.

According to a third feature of the present invention, in addition to the above-described second feature, the rib extends to a bottom wall of the roof lining engaging groove from the inner surface of the roof lining engaging groove, which is near the pillar.

According to the above-described construction, the rib is extended to the bottom wall of the roof lining engaging groove from the inner surface of the roof lining engaging groove, which is near the pillar, and therefore even if the roof lining is expanded by heat due to increase in temperature, the heat expansion can be absorbed by causing the rib on the bottom wall of the roof lining engaging groove bite into the end edge.

According to a fourth feature of the present invention, in addition to the third feature, a position of the end edge of the roof lining at a room temperature is located within a first predetermined distance upward from an upper end of the rib in the bottom wall of the roof lining engaging groove, and is located outside a second predetermined distance downward from an upper end of the inner surface of the roof lining engaging groove, which is near the vehicle compartment.

According to the above-described construction, the position of the end edge of the roof lining at the room temperature is within the first predetermined distance upward from the upper end of the rib in the bottom wall of the roof lining engaging groove, and therefore even if the roof lining expands by heat due to the temperature rising higher than the room temperature, the heat expansion of the roof lining can be absorbed by the first predetermined distance. Even if the temperature rises further, the heat expansion can be absorbed by causing the rib on the bottom wall of the roof lining engaging groove bite into the end edge of the roof lining. On the other hand, if the temperature decreases to be lower than the room temperature and the roof lining thermally contracts, the end edge of the roof lining can be prevented from falling off from the roof lining engaging groove by the second predetermined distance.

According to a fifth feature of the present invention, in addition to any one of the first to the fourth features, the rib is projectingly provided at the pillar garnish below the roof lining engaging groove to abut to the pillar.

According to the above-described construction, the rib is projectingly provided at the pillar garnish below the roof lining engaging groove to abut to the pillar, and therefore the pillar garnish is biased to the vehicle compartment with respect to the pillar by the rib to reliably engage the locking projection provided at the upper end of the pillar garnish in the locking hole of the pillar so as not to cause rattling.

According to a sixth feature of the present invention, in addition to the fifth feature, the locking projection of the pillar garnish is engaged with an upper edge of the locking hole of the pillar.

According to the above-described construction, the locking projection of the pillar garnish is engaged with the upper edge of the engaging hole of the pillar, and therefore the pillar garnish is positioned in the vertical direction to further improve the appearance of the connecting portion with the roof lining without requiring a special positioning member.

A center pillar 12 in the embodiment corresponds to the pillar of the present invention, and an upper pillar garnish 36 in the embodiment corresponds to the pillar garnish of the present invention.

The above-described object, other objects, features and advantages of the present invention will become apparent from the preferred embodiments described in detail below in conjunction with the accompanying drawings.

BRIEF DESCRIPTION OF THE DRAWINGS

FIG. 1 is a view showing an inner surface of a vehicle compartment of an automobile provided with an occupant restraint system according to the present invention.

FIG. 2 is an enlarged sectional view taken along the line 2—2 in FIG. 1.

FIG. 3 is an enlarged sectional view taken along the line 3—3 in FIG. 2.

FIG. 4 is a perspective view of an upper pillar garnish.

FIG. 5 is an enlarged view of an area near a connecting portion between a roof lining and an upper pillar garnish.

FIG. 6 is a perspective view of an upper part of the upper pillar garnish.

DESCRIPTION OF THE PREFERRED EMBODIMENT

A first embodiment of the present invention will be described below based on FIG. 1 to FIG. 4.

Figure 1:
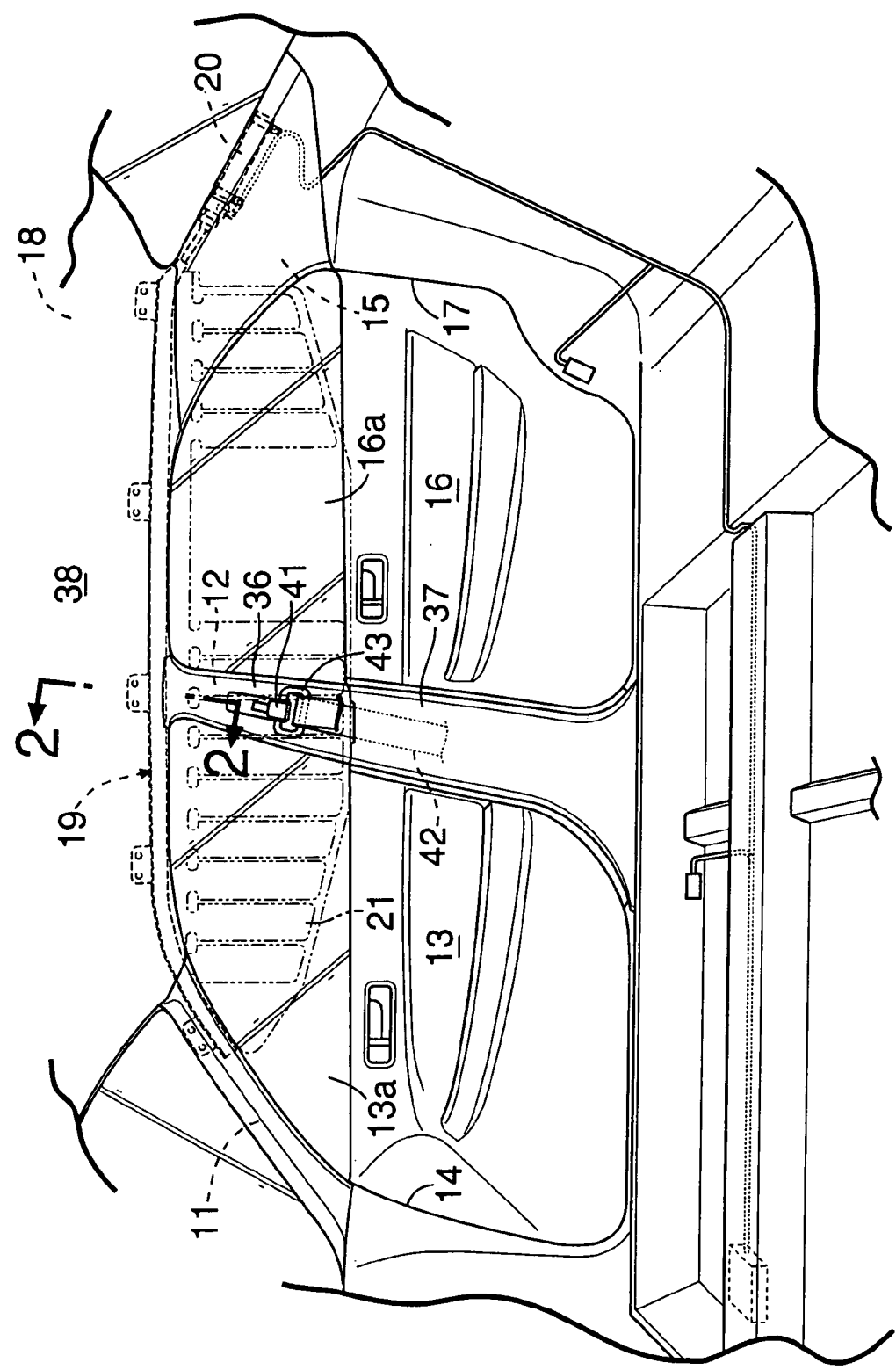
FIG. 1 to FIG. 4 show a first embodiment of the present invention.

As shown in FIG. 1, on a side surface of a vehicle body of a vehicle, a door opening 14 in which a front door 13 is mounted is formed between a front pillar 11 and a center pillar 12, and a door opening 17 in which a rear door 16 is mounted is formed between the center pillar 12 and a rear pillar 15. An airbag module 19 is provided along a side edge of a roof 18 which extends from an upper end of the front pillar 11 to an upper end of the rear pillar 15. When acceleration of a predetermined value or higher is detected at a time of collision on the side surface of the vehicle or at a time of rolling over, an airbag 21 accommodated in the air bag module 19 is inflated by a high pressure gas which is supplied from an inflator 20 disposed inside the rear pillar 15, and deploys downward into a curtain shape from the side edge of the roof 18 so as to shield occupants seated on a front seat and a rear seat against an internal side surface of the vehicle body, that is, the front pillar 11, the center pillar 12, the rear pillar 15, a door glass 13a of the front door 13 and a door glass 16a of the rear door 16.

The occupant restraint systems of substantially the same structure are provided at both left and right sides of the vehicle body, and the one provided on the right side of the vehicle body will be explained hereinafter as a representative example of them.

Figure 2:
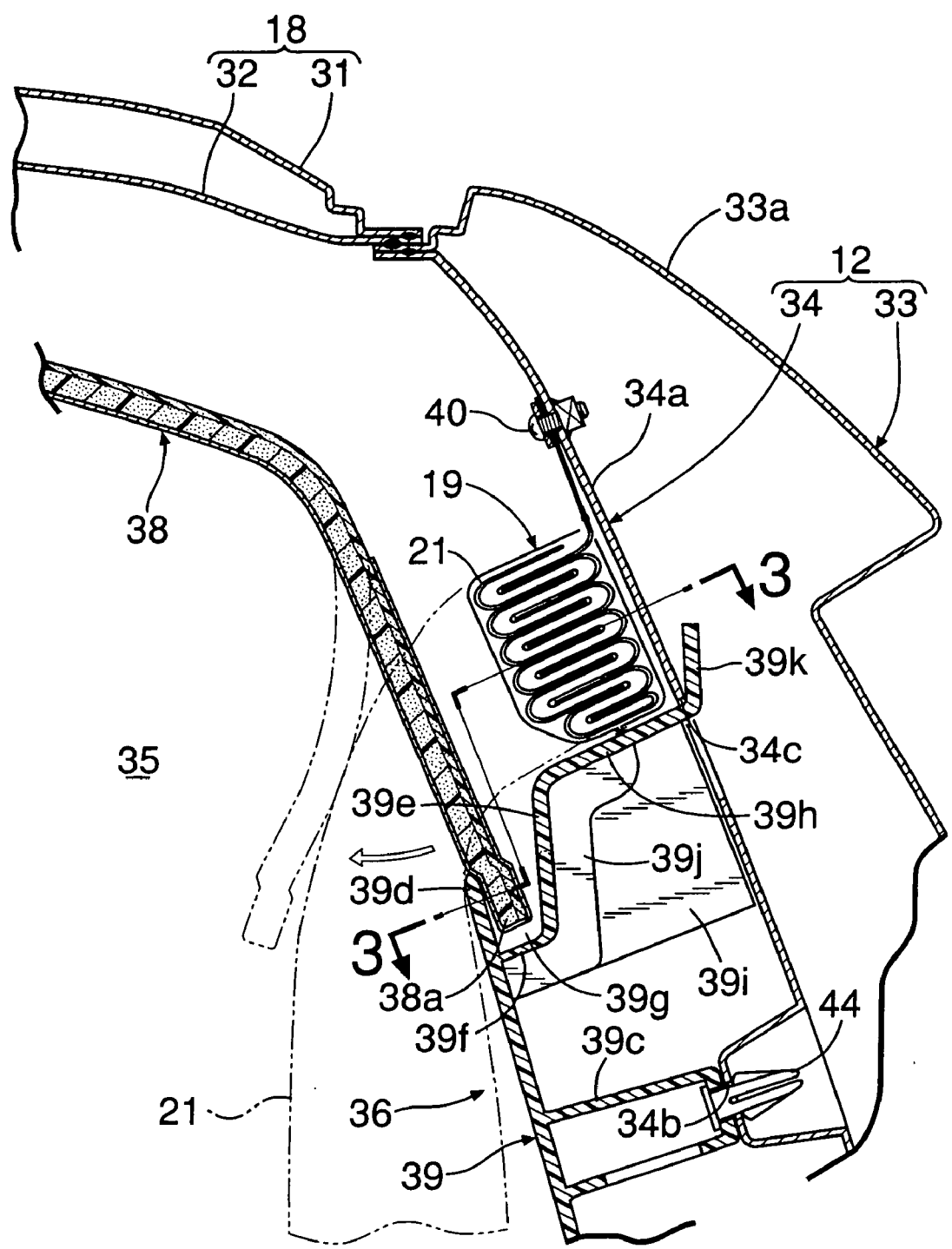
Figure 3:
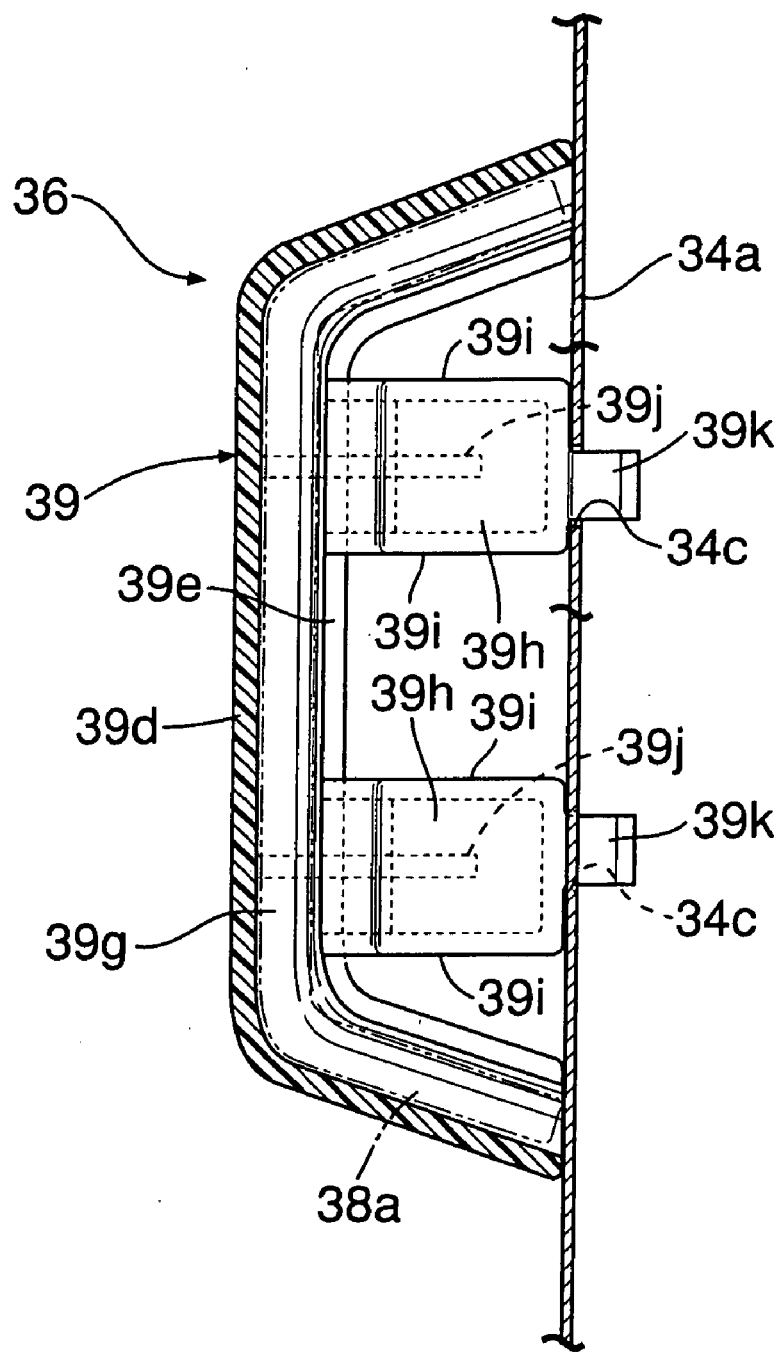
Figure 4:
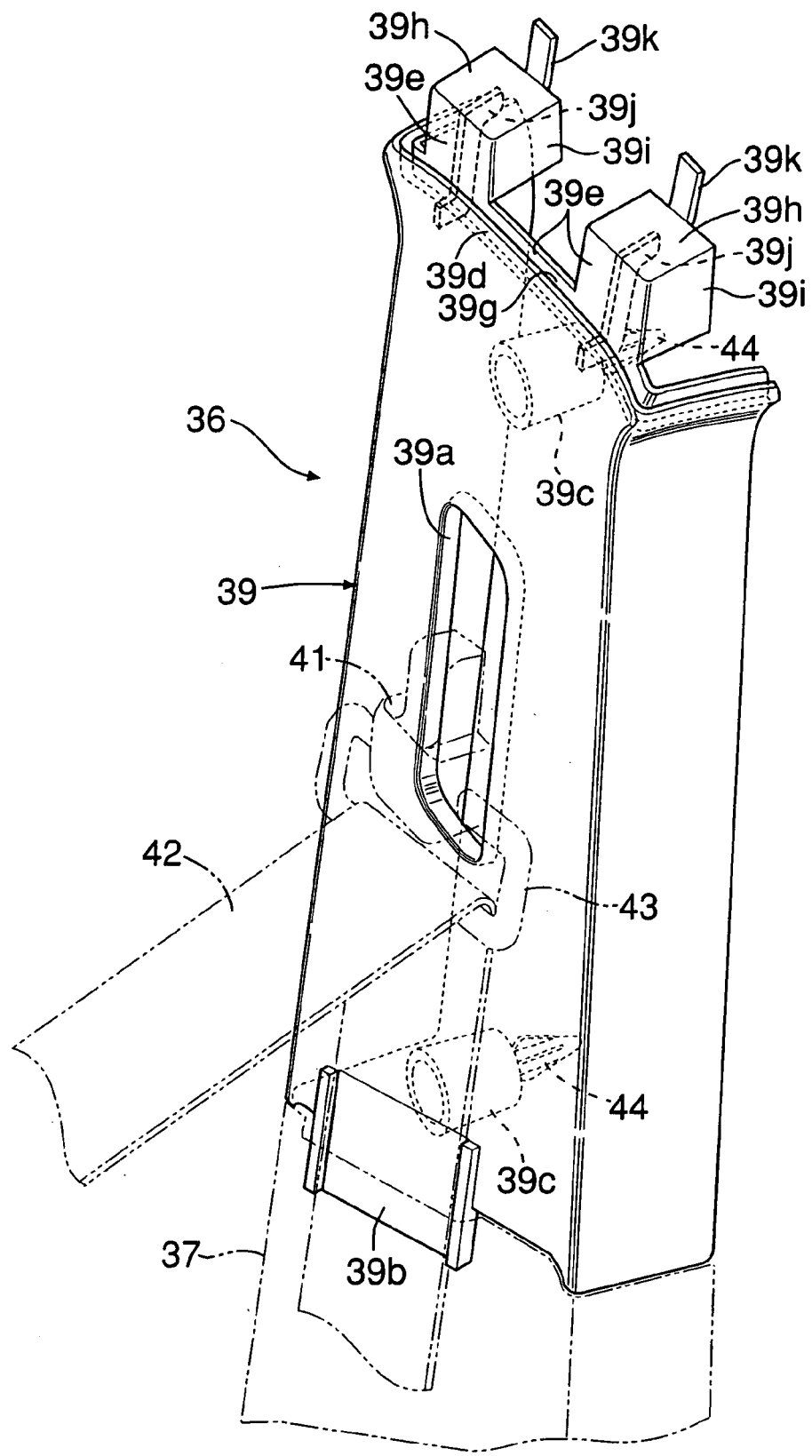

As shown in FIG. 1 and FIG. 2, the roof 18 is constructed by an outer roof 31 and an inner roof 32, and the center pillar 12 is constructed by an outer pillar 33 and an inner pillar 34. They are welded along the side edge of the roof 18. A roof side rail portion 33a at an upper end of the outer pillar 33 and a roof side rail portion 34a at an upper end of the inner pillar 34 extend in a longitudinal direction of the vehicle body toward an upper portion of the front pillar 11 and the upper portion of the rear pillar 15, and below them, the outer pillar 33 and the inner pillar 34 extend in the vertical direction to be in pillar shapes.

A surface of the inner roof 32 at a side of a vehicle compartment 35, and a surface of the roof side rail portion 34a of the inner pillar 34 at the side of the vehicle compartment 35 are covered with a roof lining 38 made of a comparatively soft synthetic resin. A surface of the inner pillar 34 at the side of the vehicle compartment 35 is covered with an upper pillar garnish 36 and a lower pillar garnish 37 which are made of a comparatively hard synthetic resin. The airbag module 19 which accommodates the folded airbag 21 is fixed to the roof side rail portion 34a of the inner pillar 34 with a bolt 40, and a rear end of the airbag 21 is connected to the inflator 20 inside the rear pillar 15.

As shown in FIG. 1 to FIG. 4, the upper pillar garnish 36 is a member which is U-shaped in section, and a slide anchor 41 is provided in an opening 39a formed at a center of a garnish body part 39 to be adjustable in the vertical position. A slip ring 43 through which a seat belt 42 slidably penetrates is supported at the slide anchor 41. A seat belt guide portion 39b is formed at a connecting portion with the lower pillar garnish 37 at the lower end of the upper pillar garnish 36, and through this seat belt guide portion 39b, the seat belt 42 is pulled into an inside of the lower pillar garnish 37 from the side of the vehicle compartment 35.

The upper pillar garnish 36 includes two upper and lower boss portions 39c and 39c which project toward the inner pillar 34, and clips 44 and 44 fitted in the boss portions 39c and 39c engage in clip holes 34b and 34b of the inner pillar 34.

A roof lining engaging groove 39g (see FIG. 2) having a first side wall 39d at the side of the vehicle compartment 35, a second side wall 39e at a side of the center pillar 12, and a bottom wall 39f which connects lower ends of the first and second side walls 39d and 39e, is formed at an upper end portion of the U-shape of the upper pillar garnish 36, and an end edge 38a of the roof lining 38 is engaged in the roof lining engaging groove 39g from above.

The height of the second side wall 39e of the roof lining engaging groove 39g is raised at two spots, from which two airbag deployment guide walls 39h and 39h are extended toward the side of the center pillar 12. Both end portions in the longitudinal direction of each of the airbag deployment guide walls 39h are connected to the second sidewall 39e via endwalls 39i and 39i, so that the airbag deployment guide wall 39h, the end walls 39i and 39i and the second side wall 39e form a box structure with high rigidity with two surfaces being opened. The airbag deployment guide wall 39h, the second side wall 39e and the bottom wall 39f are reinforced by a crank-shaped rib 39j.

Locking projections 39k and 39k extend upward from the end portions of the airbag deployment guide walls 39h and 39h at the side of the center pillar 12, and the locking projections 39k and 39k are engaged in locking holes 34c and 34c formed in the inner pillar 34, whereby the upper pillar garnish 36 is fixed to the inner pillar 34.

Thus, in the state in which the roof lining 38 is previously mounted to an undersurface of the roof 18 and the airbag module 19 is previously mounted to the roof side rail portion 34a of the inner pillar 34, a pair of locking projections 39k and 39k at the upper end of the body part 39 of the upper pillar garnish 36 are engaged from below in the locking holes 34c and 34c of the inner pillar 34, and a pair of upper and lower clips 44 and 44 are press-fitted into the clip holes 34b and 34b of the inner pillar 34, whereby the upper pillar garnish 36 is fixed to the center pillar 12. By using the locking projections 39k and 39k and the clips 44 and 44 in this manner, time required for assembling the upper pillar garnish 36 is significantly reduced as compared with the case using a bolt.

In this situation, as shown in FIG. 2, the end edge 38a of the roof lining 38 is engaged from above in the roof lining engaging groove 39g formed at the upper end of the upper pillar garnish 36, and thereby a gap is prevented from occurring to the connecting portion between the roof lining 38 and the upper pillar garnish 36, thus improving the appearance. If the end edge 38a of the roof lining 38 is engaged in the roof lining engaging groove 39g of the upper pillar garnish 36, the appearance is not influenced even if more or less variation exists in the engaging depth. Therefore, the size management of the roof lining 38 and the upper pillar garnish 36 is facilitated, and there is no fear that a gap occurs to the connecting portion even if the roof lining 38 and the upper pillar garnish 36 extend and contract more or less due to temperature variation.

The airbag module 19 is placed at the position sandwiched by the roof side rail portion 34a of the inner pillar 34 and the roof lining 38, and the airbag deployment guide walls 39h and 39h facing the undersurface of the airbag module 19 incline downward to the side of the vehicle compartment 35. Therefore, the airbag 21 inflated by a high pressure gas generated by the inflator 20 at the time of the side face collision of the vehicle is guided to the side of the vehicle compartment 35 along the upper surfaces of the airbag deployment guide walls 39h and 39h by the reaction force received from the roof side rail portion 34a of the inner pillar 34. As a result, as shown by the chain line in FIG. 2, the end edge 38a of the roof lining 38 is separated from the roof lining engaging groove 39g of the upper pillar garnish 36, and the airbag 21 is deployed into the vehicle compartment 35 from the opening formed there.

The airbag deployment guide walls 39h and 39h are integrally formed at the upper pillar garnish 36 in this manner, there by reducing the number of components and the number of assembling steps as compared with the case in which the airbag deployment guide walls are constructed by separate members. In addition, the airbag deployment guide walls 39h and 39h are positioned at a position higher than the upper end of the first side wall 39d of the roof lining engaging groove 39g at the side of the vehicle compartment 35, and therefore there is no fear that the deploying airbag 21 is caught in the roof lining engaging groove 39g.

Figure 5:
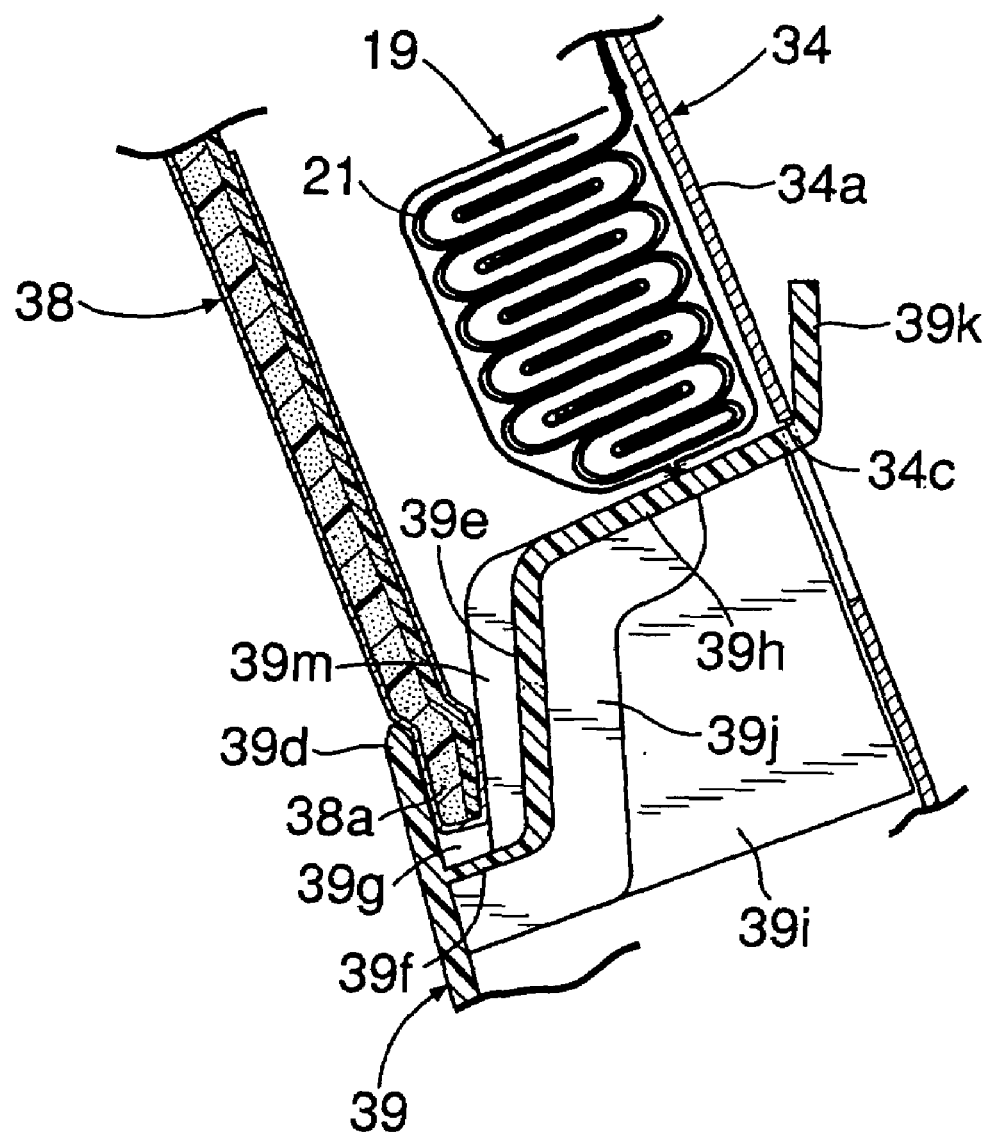
FIG. 5 and FIG. 6 show a second embodiment of the present invention.
Figure 6:
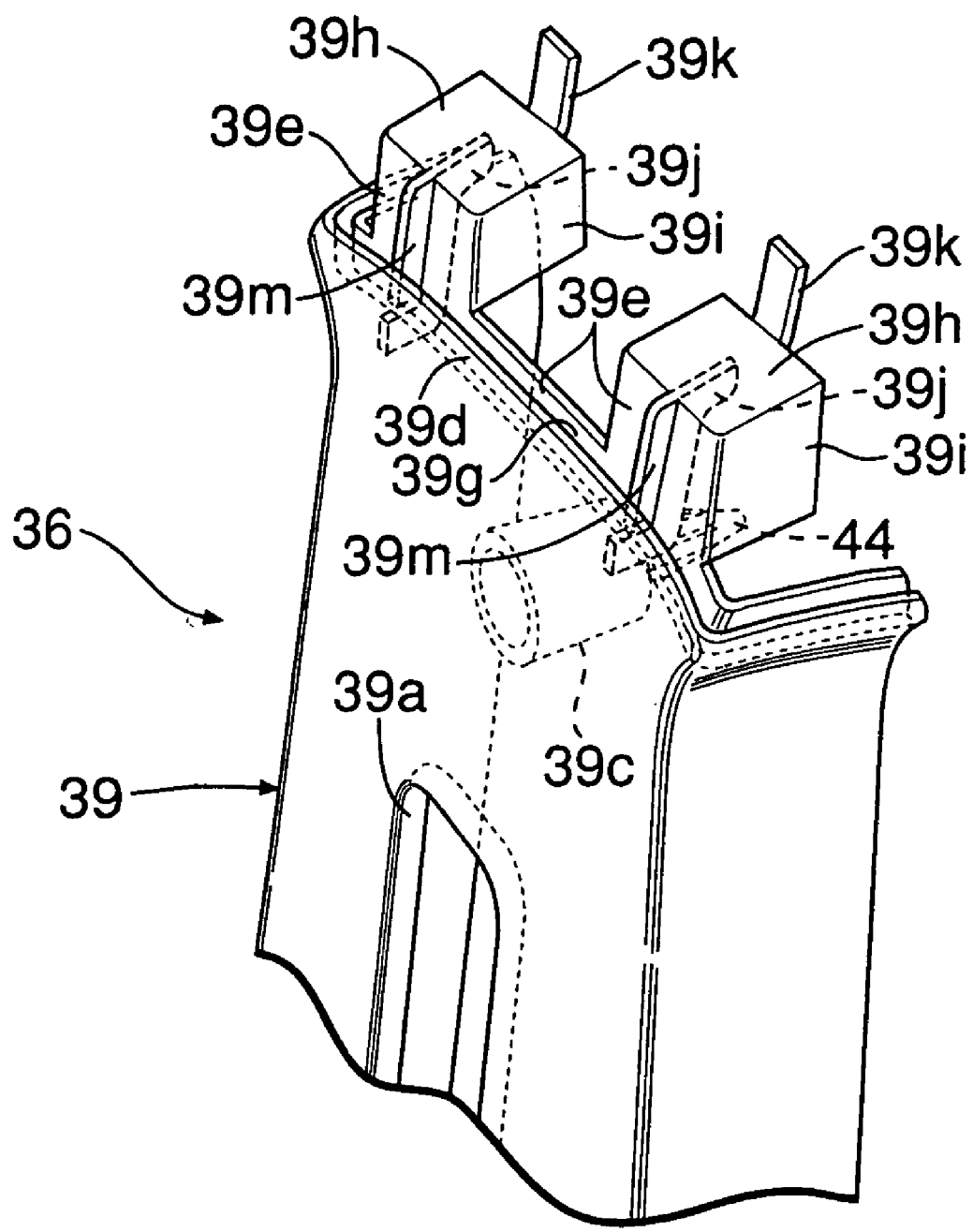

Next, a second embodiment of the present invention will be explained based on FIG. 5 and FIG. 6.

In this second embodiment, ribs 39m and 39m which project toward the first side wall 39 are provided at the second side wall 39e of the roof lining engaging groove 39g, which connects to a pair of airbag deployment guide walls 39h and 39h. Accordingly, when the end edge 38a of the roof lining 38 is engaged in the roof lining engaging groove 39g, the ribs 39m and 39m bite into the soft roof lining 38, and therefore, the roof lining 38 is made difficult to disengage from the roof lining engaging groove 39g to stabilize the assembly. In addition, the roof lining 38 is pressed against the first side wall 39d of the roof lining engaging groove 39g by the reaction force received from the ribs 39m and 39m, and therefore the gap in the connecting portion between the roof lining 38 and the upper pillar garnish 36 is made further smaller to thereby further improve the appearance.

Figure 7:
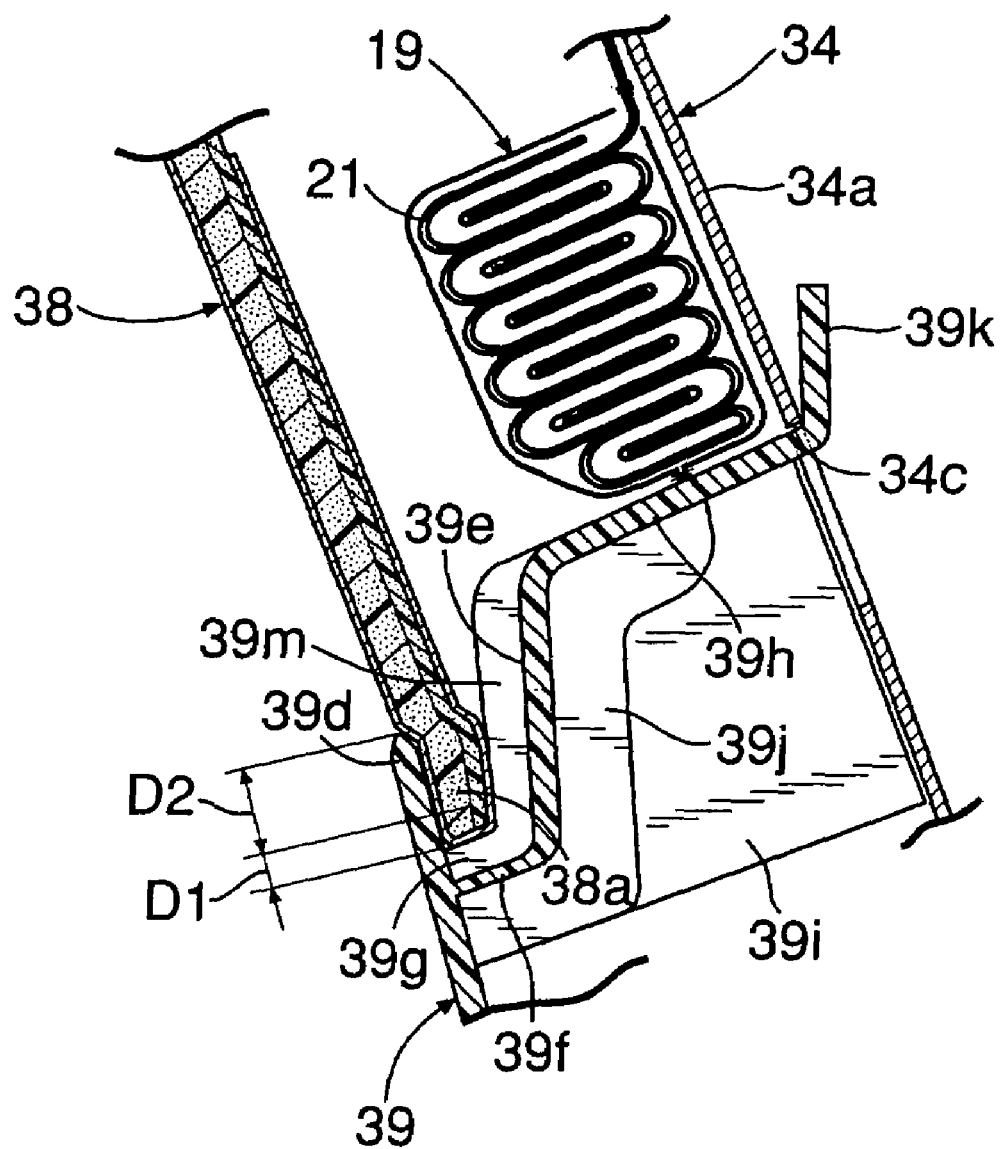
FIG. 7 is an enlarged view of the area near the connecting portion between the roof lining and the upper pillar garnish according to a third embodiment of the present invention.

Next, a third embodiment of the present invention will be explained based on FIG. 7.

The third embodiment is a modification of the second embodiment, and the ribs 39m and 39m, which are provided at the second side wall 39e of the roof lining engaging groove 39g in the second embodiment, are extended to the bottom wall 39f of the roof lining engaging groove 39g in the third embodiment. In this situation, tolerance is set so that the position of the end edge 38a of the roof lining 38 at room temperature is located within a first predetermined distance D1 upward from upper ends of the ribs 39m and 39m on the bottom wall 39f, and is located outside a second predetermined distance D2 downward from the upper end of the first side wall 39d.

Accordingly, even when the temperature rises higher than the room temperature and the end edge 38a of the roof lining 38 is thermally expanded downward, the thermal expansion can be finally absorbed by the end edge 38a of the roof lining 38 biting into the ribs 39m and 39m on the bottom wall 39f. Also, even when the temperature decreases to be lower than the room temperature and the end edge 38a of the roof lining 38 is thermally shrunk upward, the end edge 38a can be prevented from falling off from the upper end of the first side wall 39d.

Figure 8:
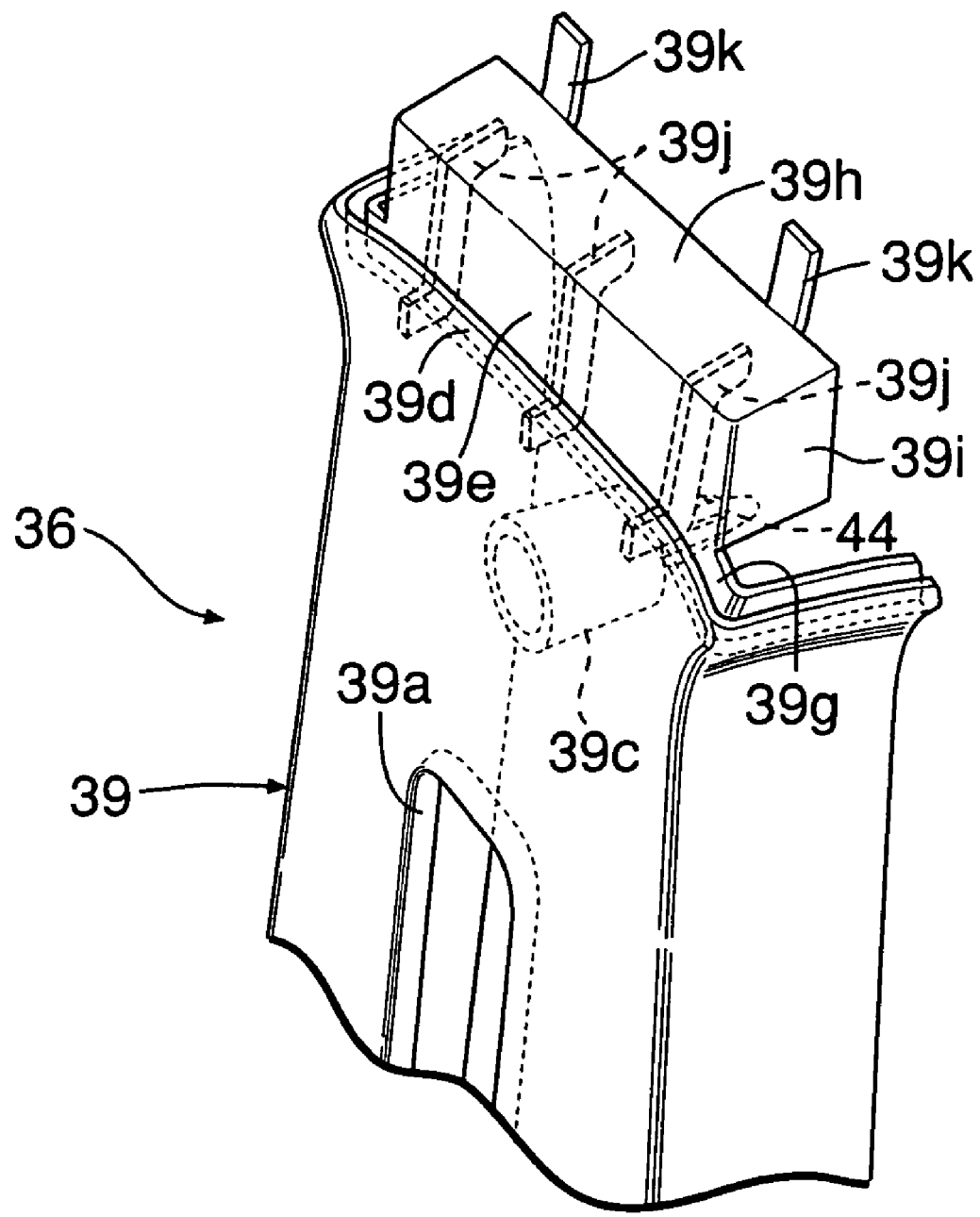
FIG. 8 is a perspective view of the upper part of the upper pillar garnish according to a fourth embodiment of the present invention.

Next, a fourth embodiment of the present invention will be explained based on FIG. 8.

The fourth embodiment is a modification of the first embodiment. While the airbag deployment guide walls 39h and 39h are formed to be separated to be two in the first embodiment, the airbag deployment guide walls 39h are combined into one in the fourth embodiment. As a result, the airbag 21 can be guided more smoothly by increasing the area of the airbag deployment guide wall 39h, and the rigidity of the airbag deployment guide wall 39h can be enhanced.

Figure 9:
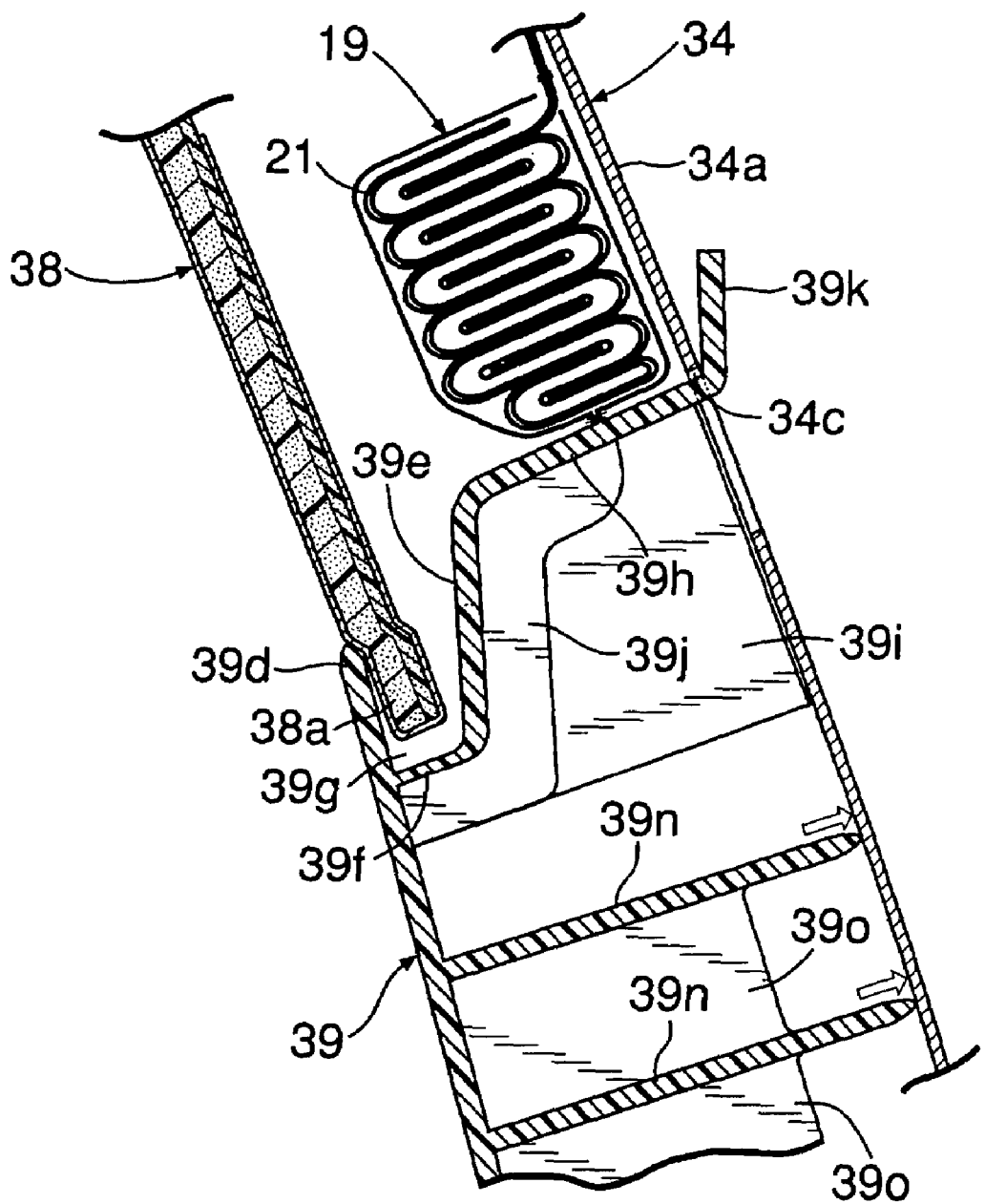
FIG. 9 is an enlarged view of the area near the connecting portion between the roof lining and the upper pillar garnish according to a fifth embodiment of the present invention.

Next, a fifth embodiment of the present invention will be explained based on FIG. 9.

A fifth embodiment is a modification of the first embodiment, and two ribs 39n and 39n, which project toward the center pillar 12, and ribs 39o and 39o which connect these ribs 39n and 39n with each other, are integrally formed below the roof lining engaging groove 39g of the upper pillar garnish 36.

Tip ends of the ribs 39n and 39n are pressed against the inner pillar 34 in the state in which the upper pillar garnish 36 is assembled to the inner pillar 34, and the upper pillar garnish 36 is biased to the vehicle compartment 35 by the reaction force, whereby the locking projections 39k and 39k of the upper pillar garnish 36 firmly engages in the locking holes 34c and 34c of the inner pillar 34, and the upper pillar garnish 36 can be prevented from rattling to further reduce the gap of the connecting portion between the roof lining 38 and the upper pillar garnish 36. In this situation, the locking projections 39k and 39k of the upper pillar garnish 36 are engaged with the upper edges of the locking holes 34c and 34c, whereby positioning of the upper pillar garnish 36 in the vertical direction can be facilitated.

The embodiments of the present invention are explained thus far, but it is possible to make various changes in design without departing from the subject matter of the present invention.

For example, the center pillar 12 is explained in the embodiments, but the present invention is also applicable to the front pillar 11 and the rear pillar 15.

What is claimed is:

1. An occupant restraint system in which an airbag module accommodating an airbag in a folded state is placed along a side edge of a roof, and the airbag inflated at a time of collision presses to open a connecting portion between a roof lining covering the roof from a side of a vehicle compartment and a pillar garnish covering a pillar from the side of the vehicle compartment, and deploys downward into the vehicle compartment, wherein the pillar garnish comprises a roof lining engaging groove which extends along a side surface of its upper end portion at a side of the pillar, an airbag deployment guide wall which extends to an outside of the vehicle compartment from an upper end of the roof lining engaging groove at the side of the pillar, and a locking projection which extends upward from an end portion of the airbag deployment guide wall at the outside of the vehicle compartment, and wherein an end edge of the roof lining is engaged in the roof lining engaging groove of the pillar garnish, the locking projection of the pillar garnish is engaged in a locking hole formed in the pillar, and the airbag module is disposed at a position sandwiched by the pillar and the roof lining, above the airbag deployment guide wall.

2. The occupant restraint system according to claim 1, wherein a rib, which bites into the end edge of the roof lining engaging in the roof lining engaging groove, is provided at an inner surface of the roof lining engaging groove, which is near the pillar.

3. The occupant restraint system according to claim 2, wherein the rib extends to a bottom wall of the roof lining engaging groove from the inner surface of the roof lining engaging groove, which is near the pillar.

4. The occupant restraint system according to claim 3, wherein a position of the end edge of the roof lining at a room temperature is located within a first predetermined distance upward from an upper end of the rib in the bottom wall of the roof lining engaging groove, and is located outside a second predetermined distance downward from an upper end of the inner surface of the roof lining engaging groove, which is near the vehicle compartment.

5. The occupant restraint system according to claim 1, wherein the rib is projectingly provided at the pillar garnish below the roof lining engaging groove to abut to the pillar.

6. The occupant restraint system according to claim 5, wherein the locking projection of the pillar garnish is engaged with an upper edge of the locking hole of the pillar.

7. The occupant restraint system according to claim 2, wherein the rib is projectingly provided at the pillar garnish below the roof lining engaging groove to abut to the pillar.

8. The occupant restraint system according to claim 7, wherein the locking projection of the pillar garnish is engaged with an upper edge of the locking hole of the pillar.

9. The occupant restraint system according to claim 3, wherein the rib is projectingly provided at the pillar garnish below the roof lining engaging groove to abut to the pillar.

10. The occupant restraint system according to claim 9, wherein the locking projection of the pillar garnish is engaged with an upper edge of the locking hole of the pillar.

11. The occupant restraint system according to claim 4, wherein the rib is projectingly provided at the pillar garnish below the roof lining engaging groove to abut to the pillar.

12. The occupant restraint system according to claim 11, wherein the locking projection of the pillar garnish is engaged with an upper edge of the locking hole of the pillar.

* * * * *